United States Patent [19]
Melas et al.

[11] Patent Number: 5,293,369
[45] Date of Patent: Mar. 8, 1994

[54] ASYNCHRONOUS SAMPLING DIGITAL DETECTOR SYSTEM FOR MAGNETIC AND OPTICAL RECORDING CHANNELS

[75] Inventors: Constantin M. Melas, Los Gatos; Pantas Sutardja, San Jose, both of Calif.

[73] Assignee: International Business Machines Corporation, Armonk, N.Y.

[21] Appl. No.: 967,669

[22] Filed: Oct. 28, 1992

[51] Int. Cl.$^5$ .............. G11B 5/09; H04N 5/76; G06F 7/38; K03D 1/22; H03K 5/153
[52] U.S. Cl. .............. 369/59; 307/354; 328/150; 364/723; 360/46
[58] Field of Search .............. 369/59, 124; 340/347; 364/724.1, 474.31, 723; 375/80, 81, 117, 121; 360/53, 65, 41, 29, 32, 45, 46, 51; 307/354, 358; 328/150, 115, 116, 117

[56] References Cited

U.S. PATENT DOCUMENTS

| | | | |
|---|---|---|---|
| 4,306,194 | 12/1981 | Chapman | 328/150 |
| 4,308,501 | 12/1981 | Tuccinardi et al. | 328/150 |
| 4,352,999 | 10/1982 | Galpin | 328/150 X |
| 4,570,153 | 2/1986 | Kobayashi et al. | 340/347 |
| 4,788,695 | 11/1988 | Iverson et al. | 375/80 |
| 4,797,845 | 1/1989 | Stikvoort | 364/724.1 |
| 4,837,722 | 6/1989 | Sara | 364/723 |
| 4,894,794 | 1/1990 | Shenk | 364/723 |
| 4,912,729 | 3/1990 | Van Rens et al. | 375/81 |
| 4,951,244 | 8/1990 | Meyer | 364/723 |
| 5,001,364 | 3/1991 | Petrie et al. | 307/354 |
| 5,018,090 | 5/1991 | Shiratsuchi | 364/723 |
| 5,051,616 | 9/1991 | Stuchbury | 307/354 |
| 5,181,226 | 1/1993 | Cantwell | 328/150 X |

OTHER PUBLICATIONS

Ronald K. Jurgen, "Good-bye to TV Ghosts", IEEE Spectrum, Jul. 1992, pp. 50-52.

*Primary Examiner*—Donald Hajec
*Assistant Examiner*—Patrick Wamsley
*Attorney, Agent, or Firm*—Baker, Maxham, Jester & Meador

[57] ABSTRACT

A variable sampling-rate digital channel phase detector for reading synchronous data recordings from magnetic or optical media. All-digital implementation allows multiplexing of several parallel channels on a single monolithic chip for tape storage systems or other magnetic or optical data storage systems. The ASDD channel signal processing is entirely digital and includes A/D converter, digital filter and equalizer, digital differentiator and zero-crossing detector, peak amplitude estimator, zero-crossing qualifier and zero-crossing position (phase) estimator. The ASDD input is an analog waveform and the output includes two flags for qualified negative and positive waveform threshold-crossings and a digital signal encoding a waveform threshold-crossing position within the current sampling clock interval. The ASDD operates over a wide continuous range of channel data rates and provides accurate phase detection at relatively low sampling rates. It is suitable for monolithic CMOS implementation, which provides low power dissipation and small size.

21 Claims, 10 Drawing Sheets

FIG. 3 DIFFERENTIATOR AND ZERO-CROSSING DETECTOR

FIG. 4  PEAK AMPLITUDE ESTIMATOR

FIG. 5 NEGATIVE TRANSITION QUALIFIER

FIG. 8 ADAPTIVE THRESHOLD FOLLOWER (FOR NON-ZERO TRANSITION THRESHOLDS)

ILLUSTRATIVE DTCL CIRCUIT

ASYNCHRONOUS SAMPLING DIGITAL DETECTOR SYSTEM FOR MAGNETIC AND OPTICAL RECORDING CHANNELS

BACKGROUND OF THE INVENTION

1. Field of the Invention

This invention relates generally to data recording channel signal detectors and, more specifically, to a digital system for detecting waveform peaks or threshold-crossings in an asynchronously-sampled data signal.

2. Discussion of the Related Art

In the data storage arts, binary data is encoded and stored on optical or magnetic media as a series of optical or magnetic threshold-crossings. Retrieval of stored data requires a detecting and decoding system in the recording channel to reconstruct the original binary data and synchronous clock from the self-clocking analog signal waveform created by the magnetic or optical transducer adjacent to the storage medium. Practitioners in the art have proposed many solutions to the problems associated with extracting synchronous clock and data signals from a self-clocking data signal. These problems include discrimination between actual threshold-crossings and mere noise pulses and precise reconstruction of the synchronous data clock signal for decoding the phase-encoded data.

Analog pulse detectors known in the art suffer from the usual disadvantages of analog electronic apparatus. They are expensive, bulky and subject to calibration drift over time. Moreover, analog pulse detectors are generally suited to a narrow predetermined range of channel data rates, imposing severe channel data rate restrictions on storage media data retrieval systems. Digital implementations of data pulse or threshold-crossing phase detectors known in the art usually rely on discrete-signal embodiments of the well-known analog detection techniques. For instance, the analog signal waveform is first sampled and digitized using well-known phase-locked loop (PLL) techniques. These samples are then processed digitally to remove unwanted frequency components and to reconstruct the synchronous clock and data.

Such a discrete-signal equivalent of a phase-locked loop circuit is disclosed by Antonia C. Van Rens, et al in U.S. Pat. No. 4,912,729. Van Rens et al disclose a digital method for detecting data pulse transitions in an asynchronously-sampled signal waveform, but their technique is restricted to controlling estimated signal threshold-crossing phase errors using a discrete-time oscillator under the control of a digital sequential filter to hold the phase error to substantially zero. The Van Rens et al digital PLL method requires asynchronous sampling rates substantially higher than the expected channel data rate. Also, if the data signal threshold-crossings temporarily drop out, their discrete-time oscillator drifts off-clock very rapidly, creating relocking delays when the data signal resumes. This also limits the variety of Run-Length Limiting (RLL) codes suitable for their device.

There is a clearly felt need in the art for a fully digital implementation of a channel waveform threshold-crossing phase detector that can accurately detect self-clocking data pulses in a recording channel data signal over a wide range of data rates. The crucial need is for accurate synchronous data detection at moderate asynchronous sampling rates because high-speed sampling techniques are disadvantageously expensive. Although decimation and interpolation techniques are available for translating sampling rates from one level to another, these techniques alone do not facilitate detection at unrestricted data rates in a data recording channel. Moreover, such sampling rate translation overhead militates against rapid, efficient decoding of phase-encoded data signals.

Digital computer programs are known in the art for simulating the functions of analog recording channels but these techniques require high sampling rates, making implementation in real-time hardware expensive and difficult as discussed above. Many of the difficulties known for digital implementation can be overcome by reducing the asynchronous analog signal sampling rate. A practical method for accurate digital phase detection at low sampling rates has not been known until now. These and other unresolved problems and deficiencies are clearly felt in the art and are solved by this invention in the manner described below.

SUMMARY OF THE INVENTION

This invention is an Asynchronous Sampling Digital Detector (ASDD) signal processing technique that is entirely digital. It is applicable to recording channels and to other sampling systems. No analog equalizers, detectors or phase-locked oscillators are necessary. Waveform sampling is entirely asynchronous.

The ASDD method of this invention consists of several elements. First, the analog signal waveform is sampled at an asynchronous rate and each sample is converted to a digital word representing instantaneous waveform amplitude.

Secondly, this analog-to-digital (A/D) converter output is equalized and filtered by digital means, such as a Finite Impulse Response (FIR) digital filter, to remove high frequency components.

Thirdly, after sampling equalization and digital filtering, the asynchronous waveform peaks or threshold-crossings are detected by the "modified linear interpolation" technique of this invention.

Finally, these waveform threshold-crossing detections are tested for qualification as data signals. Waveform threshold-crossings that do not meet the qualification criteria are rejected as noise. The ASDD output includes a digital word representing the estimated threshold-crossing time as a fraction of concurrent asynchronous sampling clock interval and two pulse qualification flags.

These digital output signals may be further processed by any useful means to reconstruct both the synchronous data clock and channel data signals. One such means is the Discrete Time Control Loop (DTCL) technique disclosed by R. A. Hutchins et al in a copending patent application entitled "Discrete Time Control Loop Method And Apparatus For Clocking, Data In An Asynchronous Channel", filed on Oct. 28, 1992, as application Ser. No. 07/967,588 and included herein in its entirety by this reference. The DTCL can be adapted to accept the output signals from the ASDD of this invention. Conventional phase-locked loop methods are also suitable for data reconstruction from ASDD output.

It is an object of this invention to achieve digital implementation of the entire waveform threshold-crossing phase detection function in a recording channel. It is a feature of this invention that the digital filtering and equalization functions are of increased accuracy over similar analog techniques. It is another feature of this invention that it is relatively insensitive to electronic noise.

It is an advantage of this invention that it can be entirely implemented in low-power high-density monolithic technology such as digital Complimentary Metal-Oxide-Semiconductor (CMOS). It is another advantage of this invention that CMOS implementation of this function is less costly than other alternatives.

It is another object of this invention to provide for zone recording adaptation where the channel detection function must follow changes in channel data rates over a wide range. It is an advantage of the ASDD of this invention that the self-clocking data rate can vary widely over the region below the ASDD asynchronous sampling clock frequency. This permits an ASDD channel to track for instance, data from a constant linear density optical disk played back on a mechanism that varies the linear speed according to radial location on the disk, and vice-versa. It also permits the channel to operate immediately upon startup of disk or tape drive motors, before attaining rated operating speed, thereby reducing storage media access delay.

It is another advantage of this invention that the digital hardware implementation of the ASDD can be shared by several parallel recording channels, leading to cost savings in parallel channel systems.

The foregoing together with other objects, features and advantages of this invention will become more apparent when referring to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, wherein.

DESCRIPTION OF THE PREFERRED EMBODIMENTS

Figure 1:
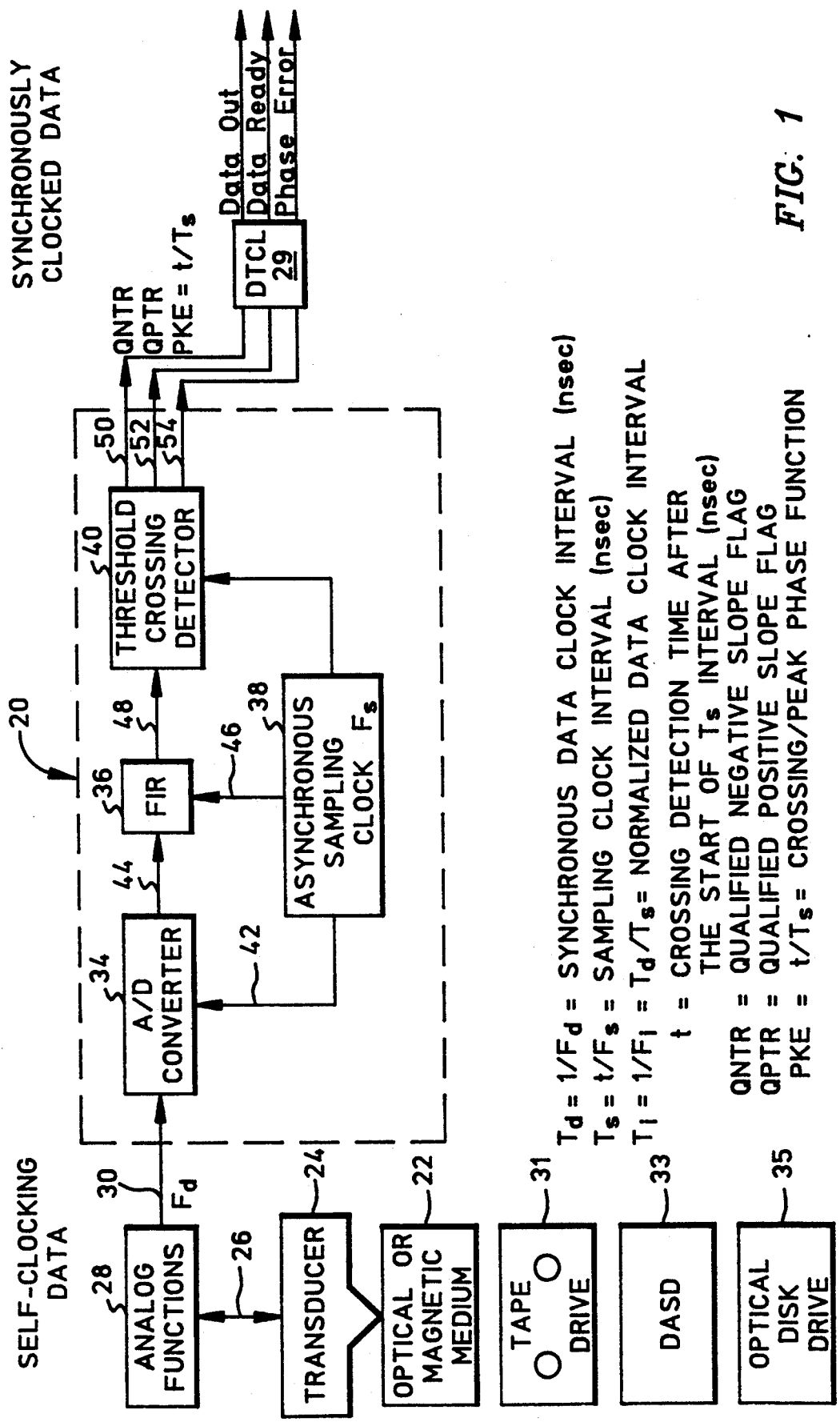
FIG. 1 provides a block diagram of the ASDD system of this invention.

FIG. 1 illustrates the relationship between the ASDD 20 of this invention and the optical or magnetic data storage medium 22. Magnetic or optical threshold-crossings in medium 22 are sensed by a transducer 24 in any useful manner known in the art. The transducer output signal 26 is presented to the usual plurality of analog functions 28. These functions include preamplification, Automatic Gain Control (AGC), and anti-aliasing (low-pass) filtering. The resultant analog data signal waveform 30 is presented to ASDD 20 for data pulse detection.

For well-known reasons, asynchronous sampling clock rate $F_s$ must be at least twice the anti-aliasing filter cut-off frequency $f_c$. Thus, the inverse of the channel code rate $F_d$ must be greater than the Nyquist factor, defined as the ratio of the double filter bandwidth ($2f_c$) to the effective customer bit rate (channel information rate). This factor must exceed unity according to the sampling theorem. The channel code rate $F_d$ is related to the channel information rate by the Run-Length Limiting (RLL) code rate used in the channel, as is well-known. Thus, the ASDD asynchronous sampling clock frequency $F_s$, which controls the A/D sampling rate, must be at least equal to the synchronous channel code rate $F_d$ buried in self-clocking waveform 30. In this invention, the ASDD asynchronous sampling clock frequency $F_s$, can be varied to match the expected maximum synchronous channel code clock rate $F_d$ and is typically set at 100% to 200% thereof.

The ASDD 20 embodiment shown in FIG. 1 embraces the Analog-To-Digital (A/D) converter 34, the Finite-Impulse-Response (FIR) digital filter 36, the asynchronous sampling clock function 38 and the threshold-crossing detector 40. Threshold-crossing detector 40 may be alternatively configured as a peak detector, as will be apparent from the discussion below.

In situations where medium 22 consists of the magnetic tape in a tape drive 31 or the magnetic disk surface in a Direct Access Storage Device (DASD) 33, the recovered data appear as peaks or pulses in waveform 30. Detection of such pulses requires differentiation in detector 40. However, where medium 22 is an optical medium such as in an optical disk drive 35, the signal may be Pulse-Width-Modulated (PWM) so that the recovered data are encoded as waveform transitions through a variable but predetermined threshold. For such applications, no signal differentiation is required in detector 40, as will be appreciated with reference to the discussion below.

A/D converter 34 operates in the usual manner known in the art by sampling data signal waveform 30 in response to the asynchronous sampling clock pulse on a line 42. This analog sample is then converted to an 8-bit digital signal on a sample bus 44. The stream of digital samples on the bus 44 is received in FIR filter 36 and processed in the usual manner known in the art for such digital filters. FIR 36 is synchronized with converter 34 by the asynchronous clocking signal $F_s$ at a line 46 and generates a series of 8-bit digital signals on the filtered sample bus 48. FIR filter 36 is usually a low-pass filter having the cut-off frequency $f_c$ discussed above.

In operation, ASDD 20 operates at an asynchronous sampling clock frequency $F_s$ that is somewhat higher (or no lower) than the expected data signal waveform clock frequency $F_d$ on line 30. The ASDD output flags are labelled QNTR on a line 50 and QPTR on a line 52. The ASDD output detection phase is labelled PKE on a line 54.

One method for recovering the binary data from the waveform on line 30 is to count the clock periods between consecutive peaks or threshold-crossings (zero-crossings) according to the digital information on lines 50–54. These counts are made by normalizing the timing detection in ASDD 20 to the normalized clock ratio $T_i = T_d/T_s$. This interval $T_i$ is determined externally in Discrete Time Control Loop (DTCL) 29 or from the synchronous data rate $F_d$ ($T_i = F_s/F_d$) recovered in any useful manner known in the art. DTCL 29 is described in the above-cited copending Hutchins et al patent application.

After the timing between peaks is normalized, it is rounded to the nearest integer to yield an exact PKD code integer, which represents the number of data clock intervals $T_d$ separating two sequential peaks (or differential zero-crossings) in the underlying RLL code.

Although FIG. 1 shows DTCL 29 as the external means for recovering synchronous data clock interval $T_d$, such external functions may be performed by any useful means known in the art. for the purpose of this disclosure.

For optical data encoded by Pulse-Width-Modulation (PWM), the waveform features of interest are threshold-crossings. For magnetic domain transition data storage, the signal peaks are desired. Because peak detection can be accomplished by detecting the zero-crossings of the waveform derivative, detection becomes a waveform "transition" or threshold-crossing detection problem for either optical or magnetic media.

Threshold-crossing detector 40 can be configured to detect waveform crossings of an arbitrary threshold or waveform peaks. Peak detection is merely a combination of waveform differentiation and zero-crossing detection as is well-known.

Figure 2:
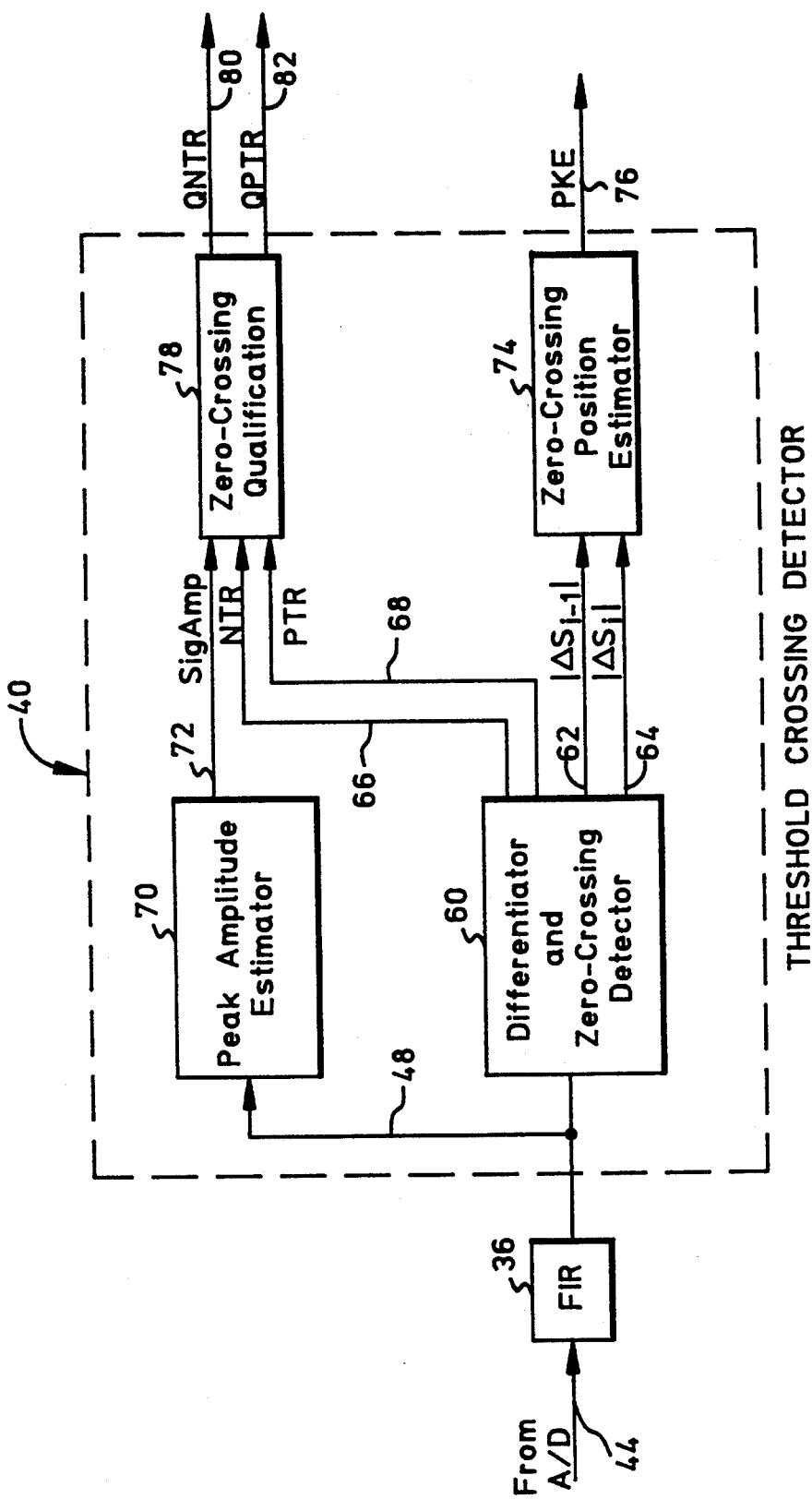
FIG. 2 provides an illustrative embodiment of the threshold-crossing detector element of this invention.

FIG. 2 shows an illustrative embodiment of threshold-crossing detector 40 configured for peak detection in signals from magnetic media. The magnetic transition stored on the storage medium is sensed as a peak in data signal waveform 30. Upon differentiation, the signal peak becomes a waveform threshold-crossing where the threshold is zero. These differentiation and zero-crossing functions are performed in the differentiator and zero-crossing detector 60 shown in FIG. 2.

Detector 60 accepts the digitally filtered sample signals on bus 48 and produces four digital output signals. The first two of these digital output signals are transmitted on the 8-bit buses 62 and 64. Bus 62 carries the absolute value of the differentiated filtered digital sample taken in the immediately preceding (i-1)$^{th}$ asynchronous sampling interval, written herein as $|\Delta S_{i-1}|$. This absolute value is obtained by stripping the sign bit from the differential over the (i-1)$^{th}$ sampling interval, $(S_{i-2} - S_{i-1})$. Bus 64 provides the differential filtered sample obtained in the current i$^{th}$ asynchronous sampling interval, written herein as $|\Delta S_i|$. Again, this represents the change over the i$^{th}$ sampling interval $(S_{i-1}-S_i)$ stripped of its sign bit.

Figure 3:
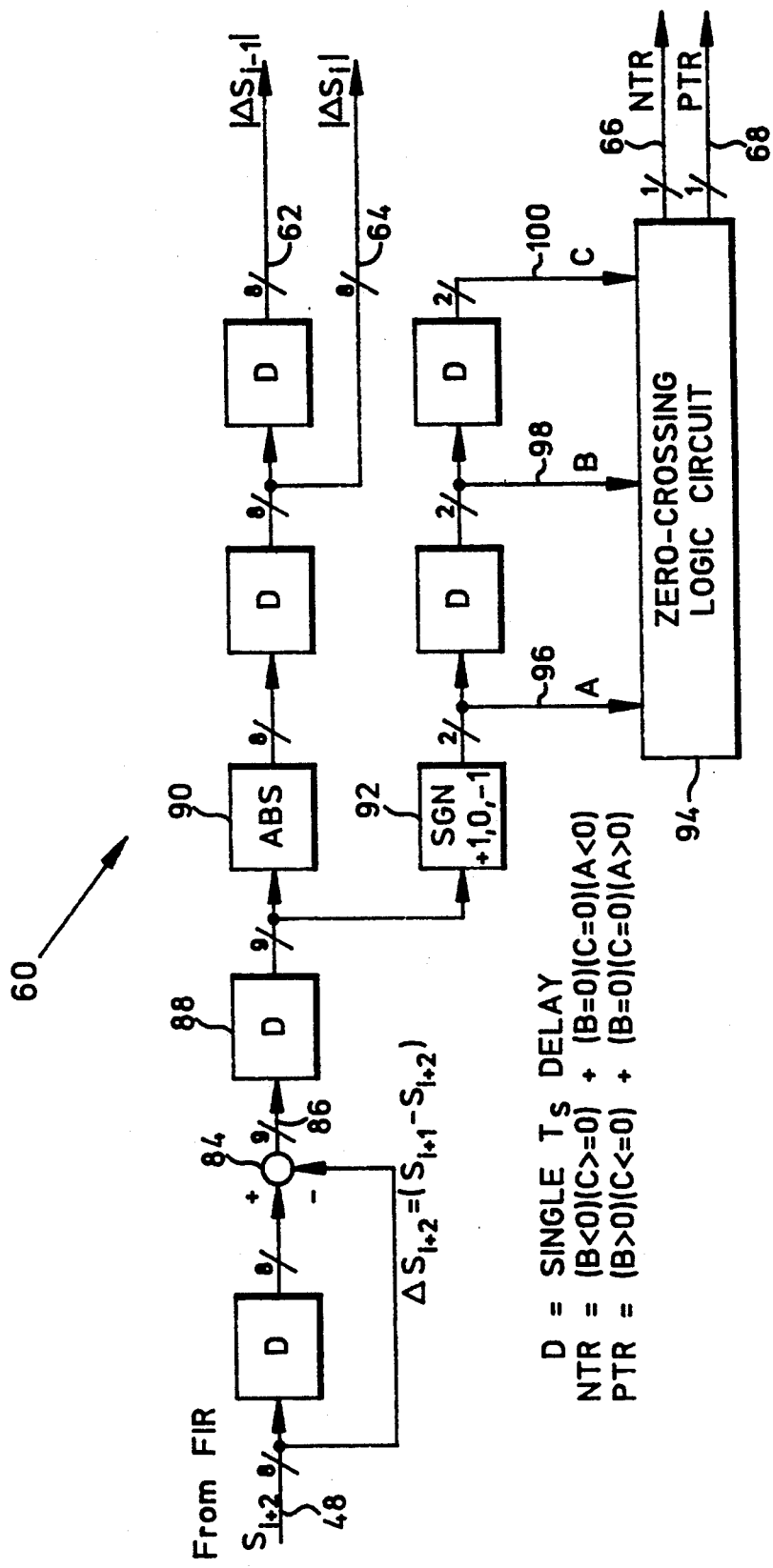
FIG. 3 provides an illustrative embodiment of the differentiator and zero-crossing detector elements of this invention.

In the method of this invention, a waveform peak is detected if two adjacent differential sample values $\Delta S_{i-1}$ and $\Delta S_i$ have opposing signs. Opposing signs indicate an intervening zero-crossing of the differential signal. However, either or both such digital samples may be precisely zero under some circumstances, which may create errors. A more sophisticated logic is necessary to detect zero-crossings in cases where one or both samples are zero-valued (FIG. 3).

Figure 8:
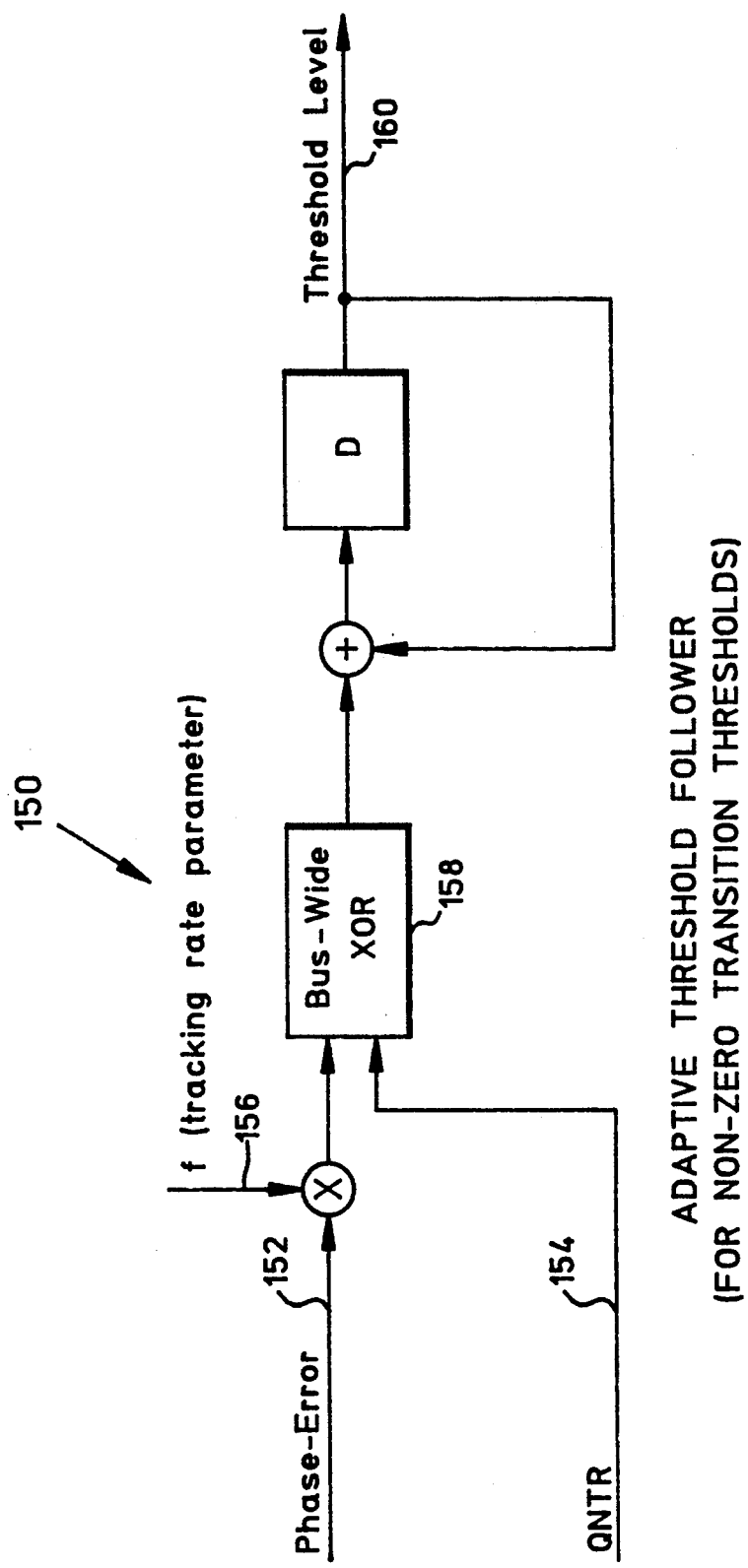
FIG. 8 provides an illustrative embodiment of an adaptive threshold follower for use with an optical Pulse-Width Modulated (PWM) recording channel.

The other two digital outputs from detector 60 are provided on the lines 66 and 68. Line 66 provides a signal-bit flag (NTR flag) that is held positive for the entire sampling interval wherein a negative-slope threshold-crossing is detected. Similarly, line 68 carries a single-bit flag (PTR flag) that is held positive over the sampling interval wherein a positive-slope threshold-crossing is detected. In some simple embodiments, the NTR and PTR flags can be logically combined to form a single TR flag signifying the presence of either detection within the sampling interval. The polarity of the detected threshold-crossing is preserved in the ASDD of this invention to permit implementation of adaptive threshold-crossing detection for optical PWM signal processing (FIG. 8).

The ASDD of this invention qualifies the detection (discriminates between signal and noise peaks) by evaluating another signal parameter at the zero-crossing of the waveform derivative. For a zero-crossing of the waveform, the waveform slope is the qualifying parameter. For a zero-crossing of the derivative, the qualification parameter of interest is the peak amplitude, which is evaluated by the peak amplitude estimator 70 using either the "quasi-cubic interpolation" method of this invention or any other useful method. The estimated peak amplitude (SigAmp) is an 8-bit digital signal on the amplitude bus 72.

The modified linear interpolation method of this invention detects a waveform zero-crossing by first searching for a sampling interval $(T_i)$ bounded by two consecutive digital differential samples $(\Delta S_{i-1}, \Delta S_i)$ of opposing polarity. The zero-crossing time within the i$^{th}$ interval (PKE ) is then estimated by interpolation, either linear interpolation assuming that the signal waveform traces a straight line between the two consecutive samples or some form of nonlinear interpolation.

At the low sampling frequencies of this invention, the linear assumption is not necessarily valid and can lead to significant errors in threshold-crossing phase estimates. Threshold-crossing phase may alternatively be estimated by assuming a nonlinear path between the two consecutive samples. Such a nonlinear path is embodied in a "look-up" table in the zero-crossing position estimator 74.

Figure 7:
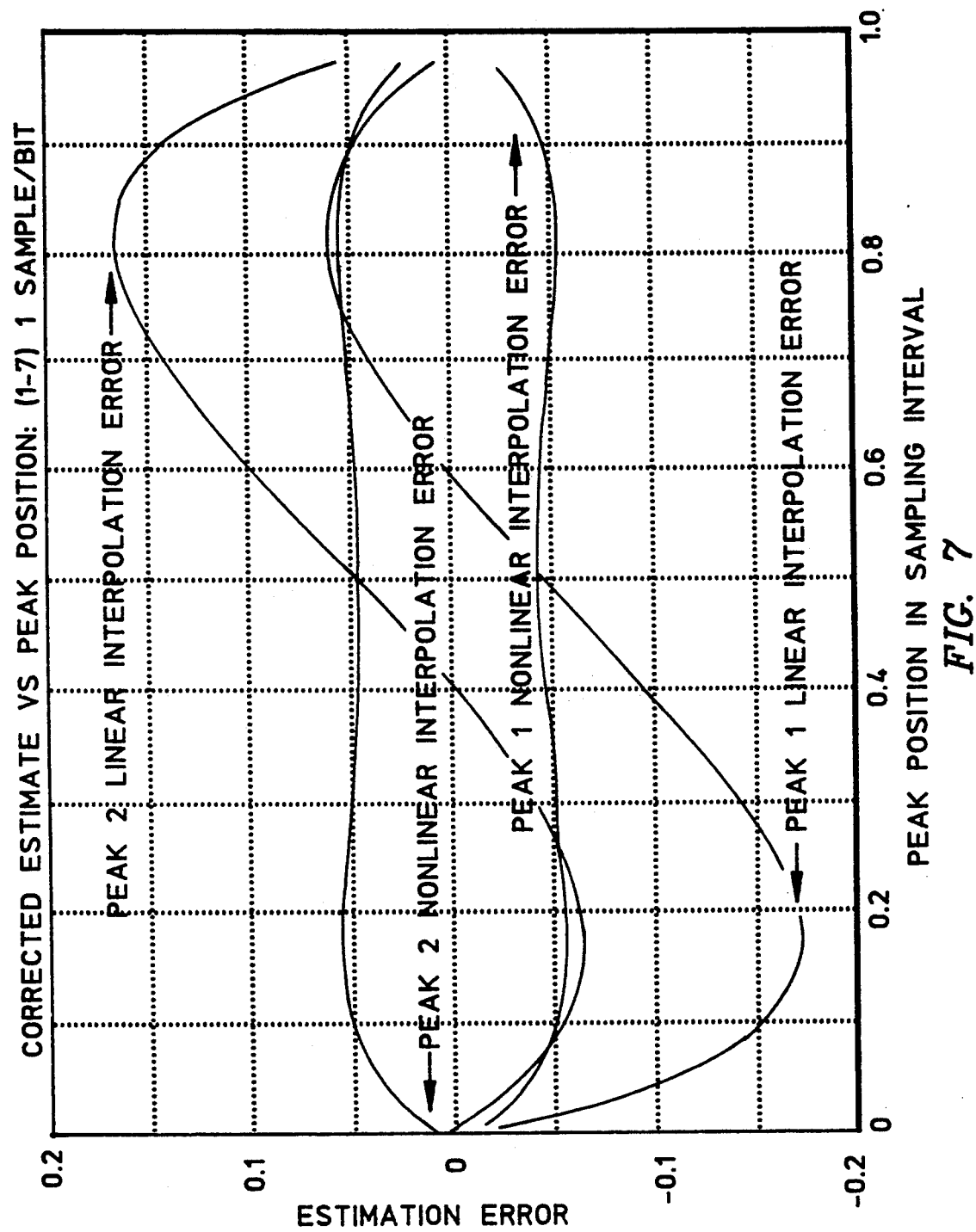
FIG. 7 illustrates the estimated peak position function for the linear and nonlinear interpolation methods of this invention.

The modified linear interpolation method of this invention using a simple nonlinear look-up table reduces threshold-crossing detection phase errors to less than six percent (6%) of the sampling interval, $T_s$ (FIG. 7).

Waveform threshold-crossing phase PKE is estimated by zero-crossing position estimator 74 in FIG. 2. Estimator 74 accepts the magnitudes of the two 8-bit differential samples on either side of the i$^{th}$ asynchronous sampling interval $(\Delta S_{i-1}$ and $\Delta S_i)$. The phase $PKE = t/T_s$ estimate is generated by interpolation at the 8-bit output bus 76. The PKE digital signal on bus 76 represents the fractional location within the i$^{th}$ sampling interval $T_s$ at which the data signal waveform peak or threshold-crossing occurs. PKE is valued between zero and unity.

Since not all asynchronous sampling intervals contain waveform threshold-crossings, threshold-crossing detector 40 must also provide a detection flag signalling the presence of a threshold-crossing within the i$^{th}$ sampling interval. Also, to avoid "false alarm" threshold-crossing detections arising from spurious noise, each such detection flag is screened or "qualified" by the zero-crossing qualification circuit 78. Circuit 78 accepts the NTR and PTR threshold-crossing flags from detector 60 and the (SigAmp) value from estimator 70. After testing the 8-bit digital peak amplitude on bus 72 against an internal threshold (not shown), circuit 78 creates two one-bit output flags on the lines 80 and 82. The QNTR on line 80 is asserted for the entire duration of the sampling interval wherein a qualified negative threshold-crossing is detected.

Similarly, the QPTR flag on line 82 is asserted for the entire sampling interval wherein a qualified positive waveform threshold-crossing is detected. Both lines 80 and 82 are negatively-asserted for those sampling intervals wherein no threshold-crossings are detected. Thus, the flags on lines 80 and 82 "enable" the downstream logic (FIG. 1) to accept the 8-bit digital PKE signal on bus 76.

The individual elements of threshold-crossing detector 40 are further described in the drawing. FIG. 3 shows an illustrative embodiment of detector 60. Much of the complexity of detector 60 is necessitated by the unusual situations where both $S_{i-1}$ and $S_i$ on buses 62 and 64 are zero-valued. The output bus 62 provides the absolute value of the differentiated $(i-1)^{th}$ sample of the differentiated waveform. Output bus 64 provides the $i^{th}$ sample. The $(i+2)^{th}$ sample of the undifferentiated signal is provided at the input on bus 48. Thus, it will be appreciated that detector 60 introduces a delay of two asynchronous sampling periods, $2T_s$. The digital differentiator 84 provides the $(i+2)^{th}$ differential value of $(S_{i+1}-S_{i+2})=-\Delta S_{i+2}$ on the nine-bit differential bus 86.

Differential digital signal 86 is delayed by one sampling interval $T_s$ at a delay device 88. After the delay, the nine-bit bus is separated into an 8-bit absolute value at the ABS truncation circuit 90 and a two-bit sign at the SGN truncation circuit 92. The two-bit output from circuit 92 codes the sign values of $+1$, 0 or $-1$. These signs are then progressively delayed to provide a series of three sign inputs into a zero-crossing logic circuit 94 at the lines 96, 98 and 100. These inputs are $s_{i+1}$, $s_i$, and $s_{i-1}$, which are labeled in FIG. 3 as A, B and C, respectively. The Boolean relationship between the NTR and PTR flags on lines 66 and 68 and the signs A, B and C on lines 96-100 are specified in FIG. 3. The logic identifies any movement from zero as a zero-crossing.

Figure 4:
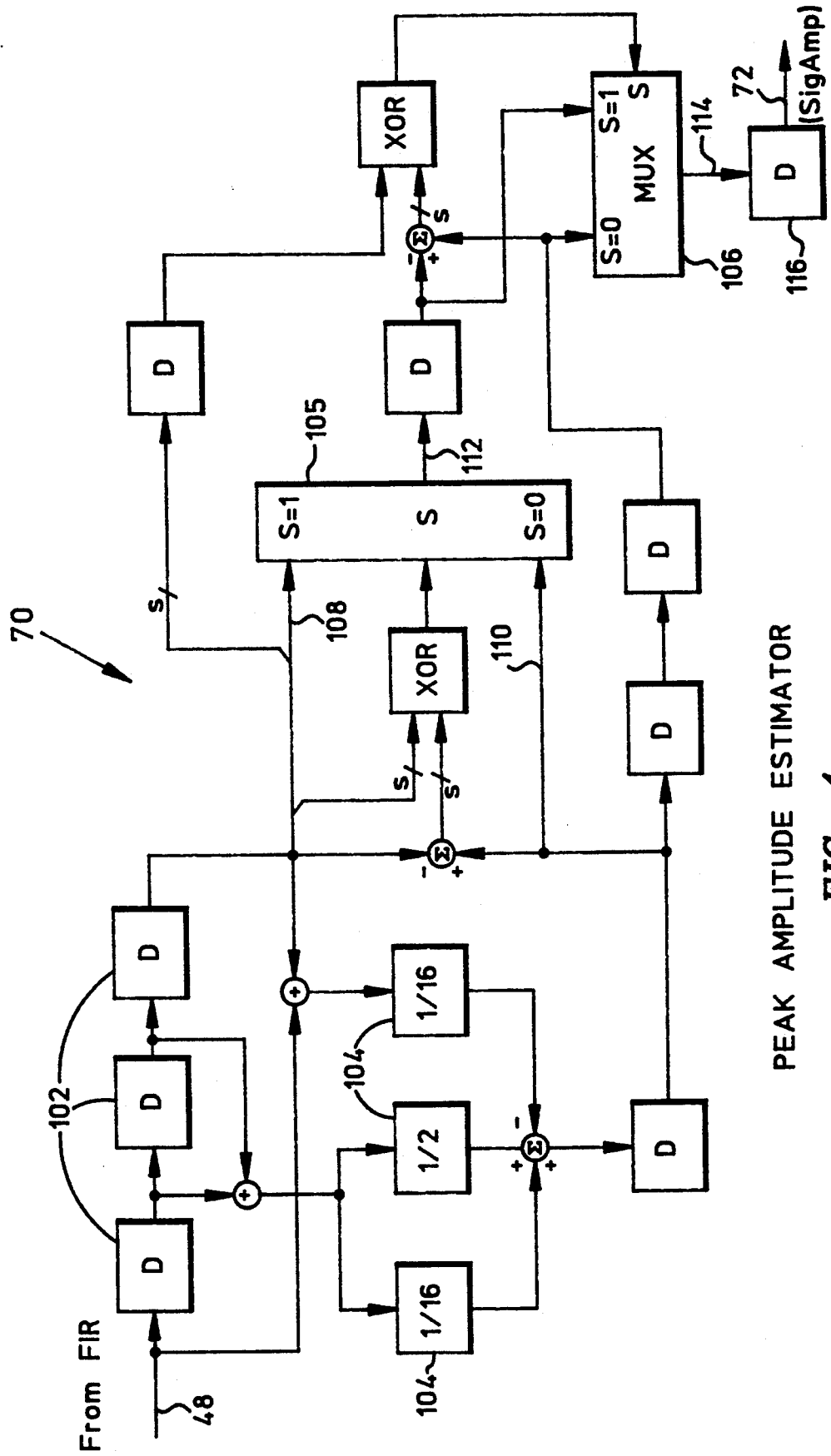
FIG. 4 provides an illustrative embodiment of the peak amplitude estimator and cubic interpolator of this invention.

FIG. 4 shows an illustrative embodiment of peak amplitude estimator 70 employing the "cubic interpolator" method of this invention. Estimator 70 accepts the undifferentiated sample values on bus 48 from FIR 36 and, using the series of delays 102, effects a comparison among four sequential samples of the data signal waveform amplitude. The samples are combined with the weighting coefficients 104 to develop a peak amplitude estimate. Coefficients 104 are selected to be simple binary fractions for ease of implementation.

The remainder of the logic in FIG. 4 consists of the multiplexers (MUXs) 105 and 106 with associated delay modules (D) and XOR logic. MUX 105 selects one of the values on the two 8-bit buses 108 and 110, switching the selected value to the output bus 112.

The signs of the adjacent values involved in this comparison are split off from the main buses on lines labeled "s" in FIG. 4. MUX 105 discriminates between the first and third samples, making a different selection when the earlier sample is positive than when the earlier sample is negative. Thus, MUX 105 selects the lower of the two digital signal values on buses 108 and 110 if the earlier value is negative and selects the higher of those two values if the earlier value is positive. The output bus 112 presents the selection between the first and third signals in the sequence to a second identical selection circuit associated with MUX 106.

MUX 106 compares the second of the three digital signals with the earlier selection between the first and third signals, selecting a final signal from the three sequential samples and putting it on bus 114, enforcing the same logic as was discussed above in connection with MUX 105. Finally, a delay 116 is provided to synchronize the estimated signal amplitude output (SigAmp) at bus 72 with the remaining elements of threshold-crossing detector 40.

Zero-crossing qualification circuit 78 in FIG. 2 includes logic for qualifying both negative-transiting detections and positive-transiting detections. Because the circuits are essentially identical in function, only the negative threshold-crossing qualifying circuit 118 illustrated in FIG. 5 is discussed herein.

Figure 5:
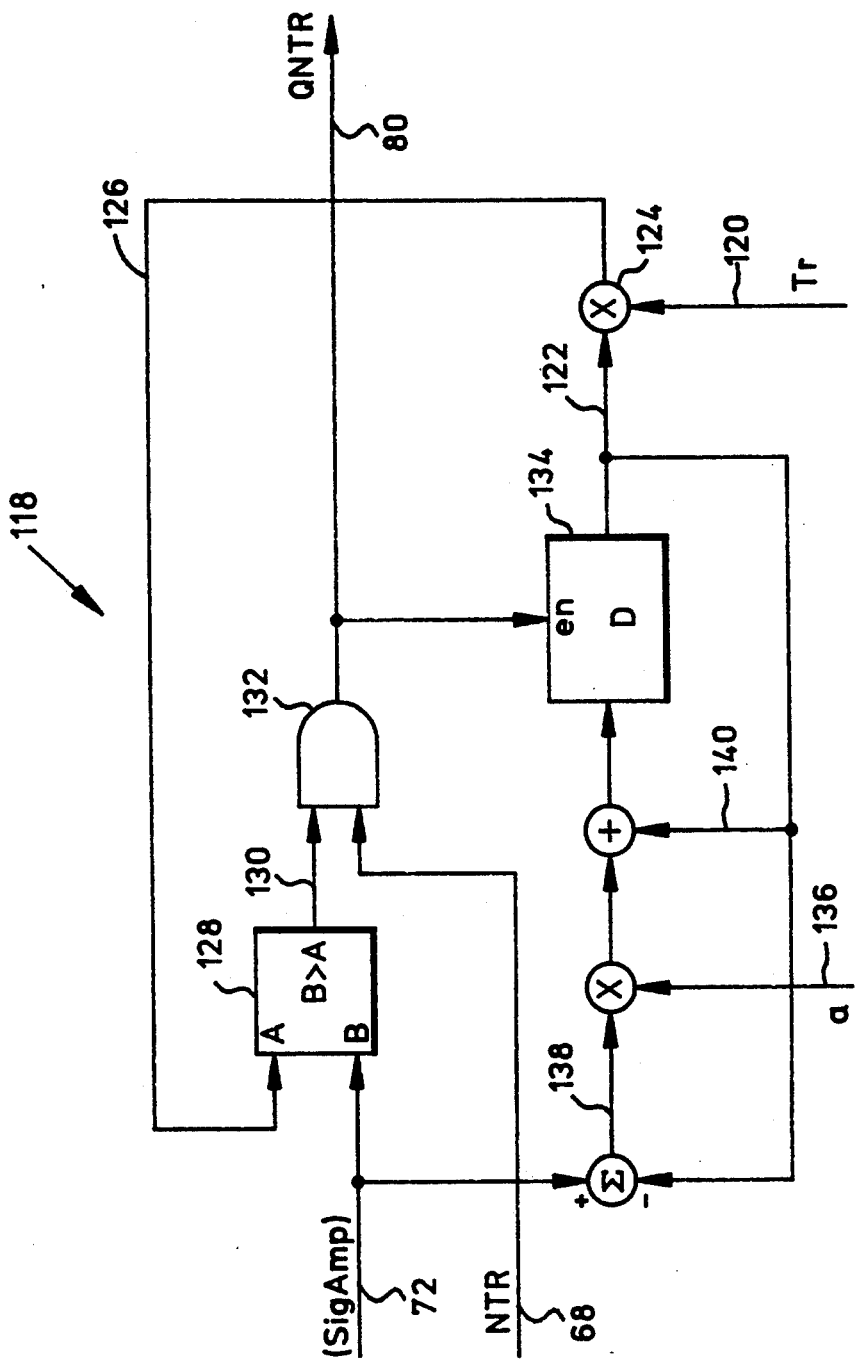
FIG. 5 provides an illustrative embodiment of the threshold-crossing qualification circuit of this invention for negative-going threshold-crossings.

The circuit in FIG. 5 will be recognized by practitioners in the art as a gated Infinite-Impulse-Response (IIR) digital filter operating as an envelope peak detector. The digital signal provided at the bus 120 represents the threshold qualification ratio $T_r$. It is multiplied with the signal envelope value on the bus 122 at a multiplier 124. The output of multiplier 124 is the threshold level, which is fed back on a bus 126 to the comparator 128 where it is compared with the pulse amplitude (SigAmp) output on bus 72 from estimator 70.

Comparator 128 creates a qualification flag on the line 130 for the entire asynchronous sampling interval wherein a pulse amplitude on bus 72 is found to exceed the threshold on bus 126. This qualification flag is logically combined with the negative transition detection flag NTR on line 68, using the simple AND-gate 132. The output of AND-gate 132 is the QNTR flag on line 80 discussed above in connection with FIG. 2.

The QNTR flag also "enables" the delay register 134, clocking through the signal envelope value. The digital value on the bus 136 determines the tracking rate of the signal envelope by weighting the "input" component on the bus 138 relative to the fed-back "output" component on the bus 140. The logic essentially provides an envelope value "OUTPUT" at bus 122 described by the formula:

$$OUTPUT_{i+1} = (INPUT_i * a + OUTPUT_i * [1-a]) * QNTR_{i+1},$$

where "a" is the weighting factor on bus 136.

Figure 6:
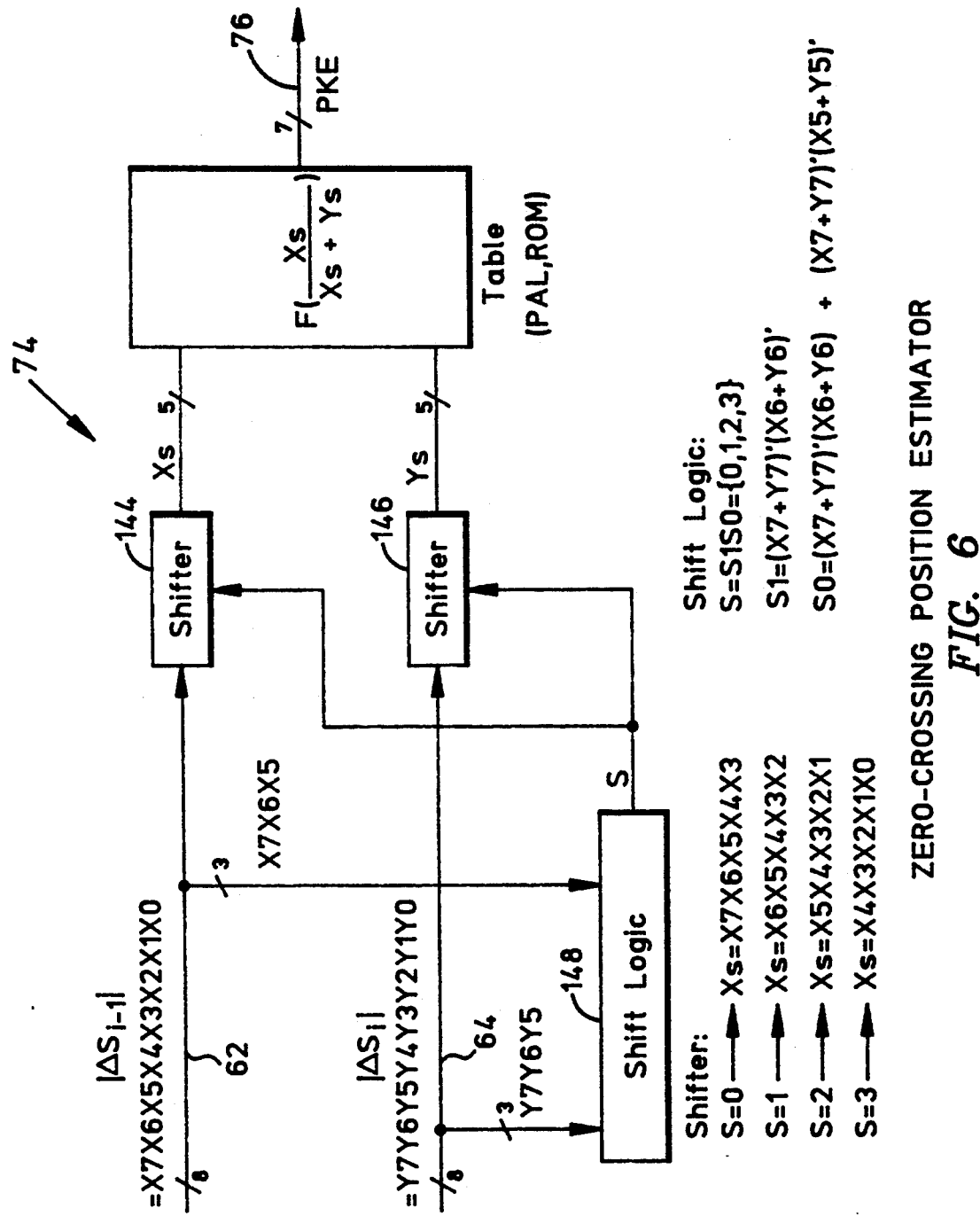
FIG. 6 provides an illustrative embodiment of the zero-crossing position estimator of this invention.

The key element of threshold-crossing detector 40 is perhaps estimator 74, which is illustrated in FIG. 6. Estimator 74 receives two digital signals on buses 62 and 64 and generates on bus 76 the $PKE_i$ signal representing the estimated threshold-crossing location within the present sampling interval. The shifters 144 and 146 reduce the necessary size of ROM 142 by deleting the three least significant bits (LSBs) in the digital input signals. The shift logic 148 avoids a full three-bit shift in cases where the most significant bit or bits (MSBs) are zero on both buses 62 and 64.

The distance from a threshold-crossing or zero-crossing to the previous sample $S_{i-1}$ (that is, to the beginning of the present $i^{th}$ sampling interval) is determined by the table look-up embodied in a Read-Only-Memory (ROM) 142. FIG. 7 illustrates the performance of two different interpolation formulas for a (1,7) RLL code.

Either interpolation formula can be implemented in estimator 74 by changing the contents (look-up table) of ROM 142.

Simple linear interpolation error is greater than error arising from certain nonlinear assumptions of threshold-crossings between sample points. In the example shown in FIG. 7, nonlinear interpolation provides significantly less estimation error than linear interpolation, but is slower. The inventors have demonstrated that the improvement in overall performance is relatively modest and may not be worth the additional processing time. For instance, linear interpolation using a (1,7) RLL code signal sampled asynchronously at the data clock rate $F_d$ provides worst-case errors of only 17% of the sampling interval $T_s$. By adding a more sophisticated nonlinear interpolation table, this error can be reduced to 6% of a sampling interval. Overall channel Bit Error Rate (BER) performance may not be materially affected by the difference between the two errors. Moreover, simple linear interpolation is faster and easier to implement than the more sophisticated ROM 142 look-up table required for nonlinear interpolation. Linear interpolation does not necessarily require a look-up table.

In some applications, such as optical data recording using PWM encoding, the threshold-crossing detection cannot rely on zero-crossing techniques because the threshold level is set at a value other than zero. FIG. 8 provides an illustrative embodiment of an adaptive threshold follower for such non-zero threshold applications. This circuit requires an external digital input (from DTCL 29 or elsewhere) representing the phase error {E} determined from the data {D} and the reconstructed synchronous data clock $F_d$. The QNTR flag is also required. A tracking rate weighting factor is included to modulate the damping of the follower circuit 150. The inputs are combined by an XOR-gate 158 and passed through a simple envelope detector to create an output threshold level at the line 160. Threshold 160 may then be input to threshold-crossing detector 40 to adjust the digital sample signals on filtered sample bus 48, thereby creating normalized digital samples suitable for zero-crossing transition testing.

Figure 9:
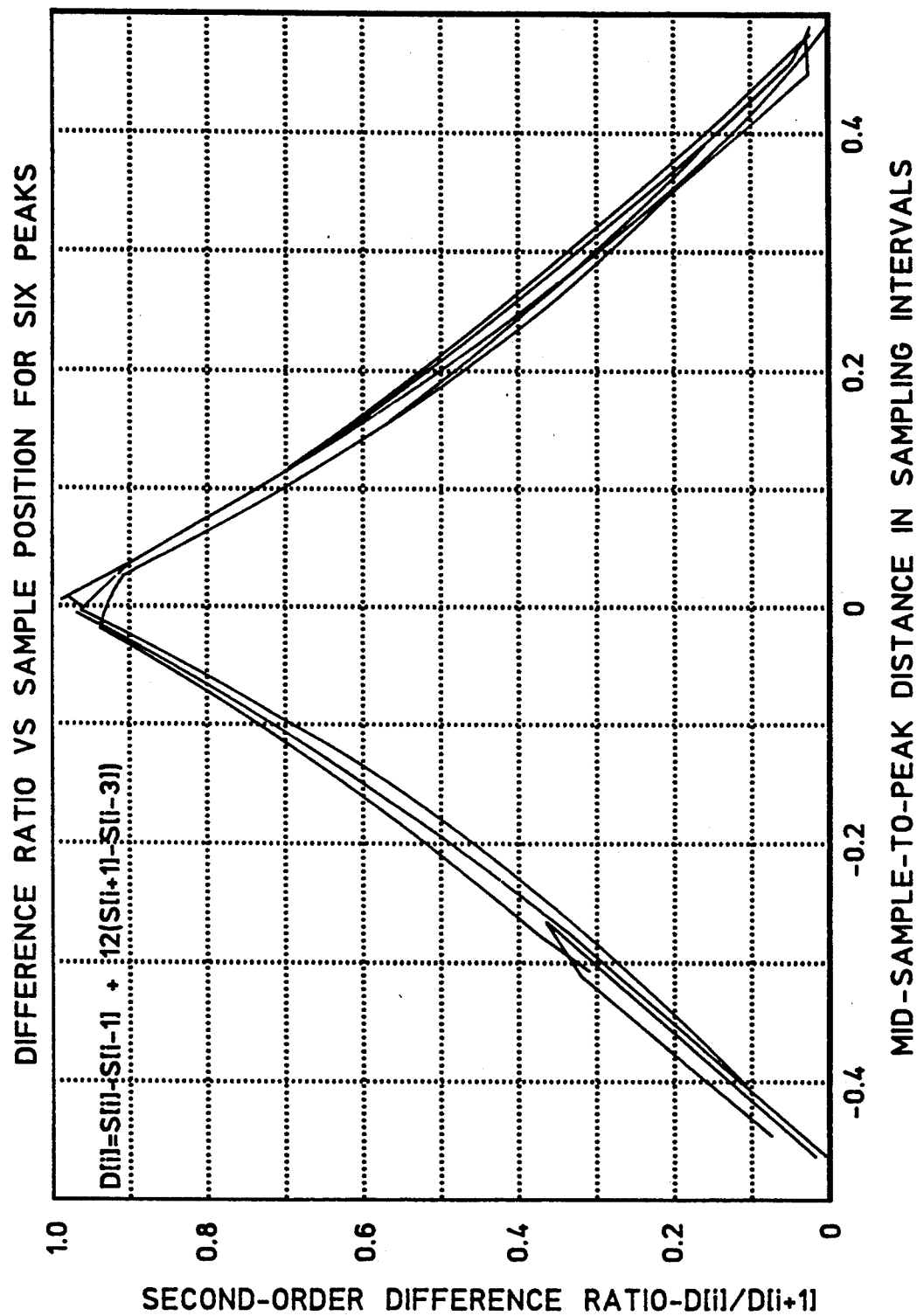
FIG. 9 shows the experimental waveform threshold-crossing detection phase errors for six different RLL codes in a recording channel.

FIG. 9 shows the ratio of two simulated consecutive opposite-polarity samples verses the known distance between the first sample and the zero-crossing detection for several peaks of a random (2,7) RLL waveform. The inventors simulated these examples on a large-scale computer and averaged results from twenty-two different sampling clock phases to generate the plot in FIG. 9. The worst-case error noted is about 4% of the sampling interval $T_s$. In the simulation, third-order differencing was used to simulate differentiation and linear interpolation was used to estimate zero-crossing location within each sampling interval. If the first-order differencing discussed above is used for differentiation, the worst error exceeds 10% of the sampling interval.

Figure 10:
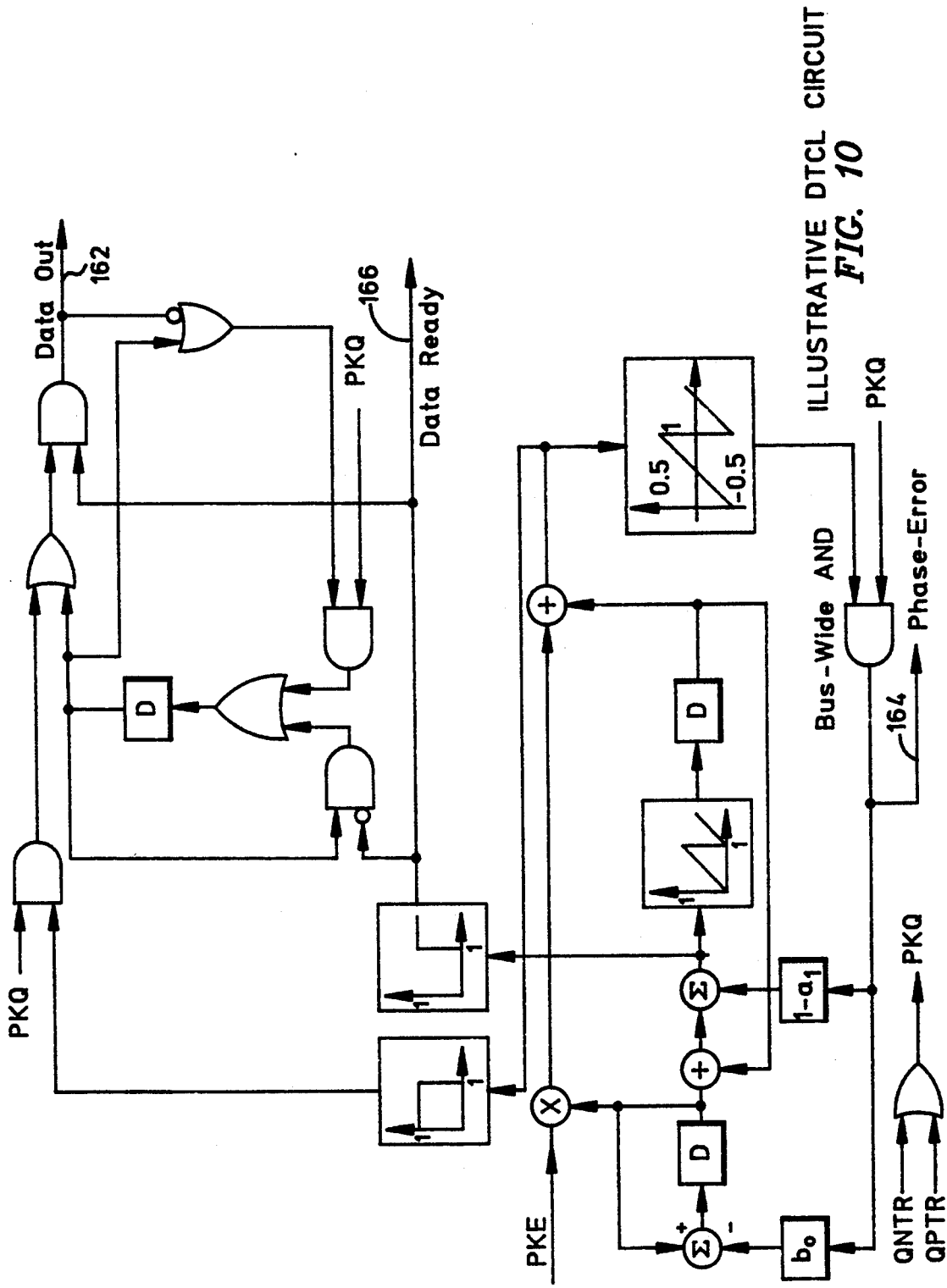
FIG. 10 provides an illustrative embodiment of a Discrete Time Control Loop (DTCL) suitable for recovering the data and clock signals from the digital outputs of the ASDD of this invention.

FIG. 10 provides an illustrative embodiment of the DTCL 56 discussed above in connection with FIG. 1. The detailed operation of the DTCL in FIG. 10 is the subject of the above-cited Hutchins et al patent application. FIG. 10 is introduced herein only to show that the QNTR, QPTR and PKE outputs from ASDD 20 may be used directly to reconstruct the data signal at a bus 162, to provide a digital phase error signal at a bus 164, and to recreate synchronous data clock frequency $F_d$ at a bus 166. Many other techniques can also be used to recreate data {D} and synchronous clock signal $F_d$ from the outputs of ASDD 20.

The ASDD of this invention is also ideally suited for global clock recovery applications. High-end magnetic tape systems are usually multitrack systems with up to eighteen heads simultaneously reading the tape at one instant. Because tape recording is basically a longitudinal system, it is reasonable to assume that large variations in the tape velocity occur in the longitudinal direction, with velocity variations from track to track being relatively small. Thus, it is useful and desirable to have a clock recovery system that uses the information from all the tape tracks to drive phase and frequency information. The ASDD is ideally suited for such applications because a number of such ASDD channels can be embodied as a single monolithic integrated circuit, either physically or through high-speed digital multiplexing. Thus, eighteen such ASDDs can be embodied on a single chip for use in providing the plurality of parallel phase detections necessary for simultaneous clock recovery in a multitrack tape system.

The global clock recovery concept has been successfully used in existing tape recording systems. The advantages include improved SNR margin, better frequency/acceleration response, reduced error lengths, and a reduction in the average size of sync-slips. The primary advantage of a global clock recovery system over a single-track clock recovery system is noted during signal dropouts. When a dropout occurs on a given track and there is no phase information for the dropout period, the associated single-track clock recovery system loses synchronization. Thus, a single-track clock recovery scheme must switch over to an open-loop mode without any feedback until the tape moves past the dropout region. However, with a global clock recovery system, even though there may be phase information missing on one or more tracks during the dropout period, phase information can be provided by the remaining tracks in the system to maintain synchronization. This reduces the size and effect of dropout errors and synchronization losses.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A method for detecting signal waveform crossings through a first threshold in a recording channel, said channel having a sampling clock rate $F_s$ equal to the reciprocal of a sampling interval $T_s$, said signal waveform containing data occurring at a synchronous data clock rate $F_d$, where i is a nonzero positive integer, said method comprising the steps of:

(a) sampling said signal waveform at the end of an $i^{th}$ said sampling interval to create an $i^{th}$ waveform sample $S_i$, said sample $S_i$ having a sign $s_i$;

(b) converting said waveform sample $S_i$ to a first digital signal representing the value of said waveform sample $S_i$ relative to said first threshold;

(c) comparing the sign s of said first digital signal $S_i$ with the sign $s_{i-1}$ of a previous said first digital signal $S_{i-1}$ from the (i-1)$^{th}$ said sampling interval;

(d) responsive to a difference between said first sign $s_i$ and said previous sign $s_{i-1}$, performing the steps of (d.1) interpolating the threshold-crossing time t of said signal waveform within said $i^{th}$ sampling interval from said previous sample $S_{i-1}$ to said sample $S_i$, (d.2) creating a second digital signal representing said threshold-crossing time t in said $i^{th}$ sampling interval, (d.3) creating one or more digital flags representing the qualification of said waveform threshold-crossing, where said qualification is responsive to a threshold-crossing slope that exceeds a second threshold.

2. The method of claim 1 wherein: said sampling clock rate $F_s$ is less than or equal to 200% of said synchronous data clock rate $F_d$.

3. The method of claim 1 wherein said interpolating step (d.1) comprises the step of:
(d.1.1) interpolating by assuming a linear characteristic for said signal waveform threshold-crossing between said previous sample $S_{i-1}$ and said sample $S_i$.

4. The method of claim 1 wherein said interpolation step (d.1) comprises the step of:
(d.1.1) interpolating by referring to a lookup-table containing a nonlinear characteristic for said signal waveform threshold-crossing between said previous sample $S_{i-1}$ and said sample $S_i$.

5. The method of claim 1 wherein said creating step (d.3) comprises the steps of:
(d.3.1) creating a first said digital flag representing the qualification of a positively transiting said waveform threshold-crossing; and
(d.3.2) creating a second said digital flag indicating the qualification of a negatively-transiting said waveform threshold-crossing.

6. In a channel having a data clock rate $F_d$ equal to the reciprocal of a data clock interval $T_d$, a digital phase detector for detecting, in an analog signal waveform, one or more signal waveform crossings through a first threshold, said detector comprising:

input means for accepting said analog signal waveform;

sampling clock means having a sampling clock rate $F_s$ equal to the reciprocal of a sampling interval $T_s$;

sampling means coupled to said input means and said sampling clock means for creating a plurality of first digital signals each representing a sample value of said signal waveform over one said sampling interval;

filtering means coupled to said sampling means for creating a plurality of second digital signals each representing a value of an equalized and filtered version of said analog signal waveform over said one sampling interval;

threshold-crossing detecting means coupled to said filtering means for detecting each said waveform threshold-crossing and for creating a third digital signal representing the phase of said each waveform threshold-crossing relative to said one sampling interval amplitude qualifying means coupled to said filtering means for creating one or more digital flags representing the qualification and polarity of said each waveform threshold-crossing where said qualification is responsive to the slope of said signal waveform relative to a second threshold.

7. The digital phase detector of claim 6 wherein said threshold-crossing detecting means comprises:

output means for providing said third digital signal representing said each waveform threshold-crossing phase and said one or more digital flags representing said waveform threshold-crossing polarity and qualification.

8. In a Direct Access Storage Device (DASD) magnetic recording channel wherein digital data stored as a series of signal threshold-crossings in said DASD are read by sensing said crossings to create an analog signal waveform having a data clock rate $F_d$ equal to the reciprocal of a data clock interval $T_d$ and having crossings through a first threshold, said data being recovered in said channel, an Asynchronous Sampling Digital Detector (ASDD) comprising:

input means for accepting said analog signal waveform;

sampling clock means having a sampling clock rate $F_s$ equal to the reciprocal of a sampling interval $T_s$;

sampling means coupled to said input means and said sampling clock means for creating a plurality of first digital signals each representing a sample value of said analog signal waveform over one said sampling interval;

filtering means coupled to said sampling means for creating a plurality of second digital signals each representing a value of an equalized and filtered version of said analog signal waveform over said one sampling interval;

threshold-crossing detecting means coupled to said filtering means for detecting each said waveform threshold-crossing and for creating a third digital signal representing the phase of said each waveform threshold-crossing relative to said one sampling interval; and qualifying means coupled to said filtering means for creating one or more digital flags representing the qualification and polarity of said each waveform threshold-crossing where said qualification is responsive to the slope of said analog signal waveform relative to a second threshold.

9. The ASDD of claim 8 wherein said threshold-crossing detecting means comprises:

output means for providing said third digital signal representing said each waveform threshold-crossing phase and said one or more digital flags representing said waveform threshold-crossing polarity and qualification.

10. In an optical Pulse-Width-Modulated (PWM) storage device recording channel wherein digital data stored as a series of signal threshold-crossings in said optical medium are read by sensing said threshold-crossings to create an analog signal waveform having a data clock rate $F_d$ equal to the reciprocal of a data clock interval $T_d$ and having crossings through a first threshold, said data being recovered in said channel, an Asynchronous Sampling Digital Detector (ASDD) comprising:

input means for accepting said analog signal waveform;

sampling clock means having a sampling clock rate $F_s$ equal to the reciprocal of a sampling interval $T_s$;

sampling means coupled to said input means and said sampling clock means for creating a plurality of first digital signals representing a sample value of said analog signal waveform over one said sampling interval;

filtering means coupled to said sampling means for creating a plurality of second digital signals each representing a value of an equalized and filtered version of said analog signal waveform over said one sampling interval;

threshold-crossing detecting means coupled to said filtering means for detecting each said waveform threshold-crossing and for creating a third digital signal representing the phase of said each waveform threshold-crossing relative to said one sampling interval; and qualifying means coupled to said filtering means for creating one or more digital flags representing the qualification and polarity of said each waveform threshold-crossing where said qualification is responsive to the slope of said analog signal waveform relative to a second threshold.

11. The ASDD of claim 10 wherein said threshold-crossing detecting means comprises:

output means for providing said fourth digital signal representing said each waveform threshold-crossing phase and said fifth digital flags representing said waveform threshold-crossing polarity and qualification.

12. In a channel having a data clock rate $F_d$ equal to the reciprocal of a data clock interval $T_d$, a digital phase detector for detecting, in an analog signal waveform, one or more signal waveform extrema, said detector comprising:

input means for accepting said analog signal waveform;

sampling clock means having a sampling clock rate $F_s$ equal to the reciprocal of a sampling interval $T_s$;

sampling means coupled to said input means and said sampling clock means for creating a plurality of first digital signals each representing a sample value of said analog signal waveform over one said sampling interval;

filtering means coupled to said sampling means for creating a plurality of second digital signals each representing a value of an equalized and filtered version of said signal waveform over said one sampling interval;

peak detecting means coupled to said filtering means for detecting each said waveform extremum and for creating a third digital signal representing the phase of said each waveform extremum relative to said one sampling interval; and amplitude qualifying means coupled to said filtering means for creating one or more digital flags representing the qualification and polarity of said each waveform extrema where said qualification is responsive to the amplitude of said signal waveform relative to a second threshold.

13. The digital phase detector of claim 12 wherein said peak detecting means comprises:

output means for providing said third digital signal representing said each waveform extremum phase and said one or more digital flags representing said each waveform extremum polarity and qualification.

14. The digital phase detector of claim 13 wherein said amplitude qualifying means comprises:

cubic interpolating means coupled to said filtering means for creating a fifth digital signal representing the amplitude of said analog signal waveform at said each waveform extremum, said amplitude being substantially equal to said waveform sample occurring simultaneously with the extremum of a moving weighted average of three sequential said second digital signals; and threshold-crossing qualifying means coupled to said cubic interpolating means for creating said one or more digital flags indicating that said analog signal waveform amplitude exceeds said second threshold at said each waveform extremum.

15. In a Direct Access Storage Device (DASD) magnetic recording channel wherein digital data stored as a series of signal transitions in said DASD are read by sensing said transitions to create an analog signal waveform having a data clock rate $F_d$ equal to the reciprocal of a data clock interval $T_d$ and having waveform extrema, said data being recovered in said channel, an Asynchronous Sampling Digital Detector (ASDD) comprising:

input means for accepting said analog signal waveform;

sampling clock means having a sampling clock rate $F_s$ equal to the reciprocal of a sampling interval $T_s$;

sampling means coupled to said input means and said sampling clock means for creating a plurality of first digital signals each representing a sample value of said analog signal waveform over one said sampling interval;

filtering means coupled to said sampling means for creating a plurality of second digital signals each representing a value of an equalized and filtered version of said analog signal waveform over said one sampling interval;

peak detecting means coupled to said filtering means for detecting each said waveform extremum and for creating a third digital signal representing the phase of said each waveform extremum relative to said one sampling interval; and amplitude qualifying means coupled to said filtering means for creating one or more digital flags representing the qualification and polarity of said each waveform extremum where said qualification is responsive to the amplitude of said analog signal waveform relative to a second threshold.

16. The ASDD of claim 15 wherein said peak detecting means comprises:

output means for providing said third digital signal representing said each waveform extremum phase and said one or more digital flags representing said each waveform extremum polarity and qualification.

17. The ASDD of claim 16 wherein said amplitude qualifying means comprises:

cubic interpolating means coupled to said filtering means for creating a fifth digital signal representing the amplitude of said analog signal waveform at said each waveform extremum, said amplitude being substantially equal to said waveform sample occurring simultaneously with the extremum of a moving weighted average of three sequential said second digital signals; and threshold-crossing qualifying means coupled to said cubic interpolating means for creating said one or more digital flags indicating that said analog signal waveform amplitude exceeds said second threshold at said each waveform extremum.

18. A method for detecting analog signal waveform extrema in a recording channel, said channel having a sampling clock rate $F_s$ equal to the reciprocal of a sampling interval $T_s$, said analog signal waveform containing data occurring at a synchronous data clock rate $F_d$, where i is a nonzero positive integer, said method comprising the steps of:

(a) sampling said analog signal waveform at the end of an $i^{th}$ said sampling interval to create an $i^{th}$ waveform sample $S_i$, said sample $S_i$ having a sign $s_i$;

(b) converting said waveform sample $S_i$ to a first digital signal representing the value of said waveform sample $S_i$ relative to said first threshold;

(c) subtracting said first digital signal representing said waveform sample $S_i$ and a previous first digital signal representing a previous said waveform sample $S_{i-1}$ from the $(i-1)^{th}$ sampling interval to create a second signal $D_i$ having a sign $d_i$, where said second signal $D_i$ represents an $i^{th}$ sample of the differentiated said analog signal waveform;

(d) comparing the sign $D_i$ of said second digital signal $D_i$ with the sign $d_{i-1}$ of a previous said second digital signal $D_{i-1}$ representing the $(i-1)^{th}$ sample of said differentiated analog signal waveform;

(e) responsive to a difference between said sign $d_i$ and said previous sign $d_{i-1}$, performing the steps of (e.1) interpolating the zero-crossing time t of said differentiated analog signal waveform within said $i^{th}$ sampling interval from said previous second digital signal $D_{i-1}$ to said second digital signal $D_i$, (e.2) creating a third digital signal representing said zero-crossing time t in said $i^{th}$ sampling interval, where said third digital signal also represents the time of an extremum in said analog signal waveform in said $i^{th}$ sampling interval, and (e.3) creating one or more digital flags representing the qualification of said analog signal waveform extremum at said time t in said $i^{th}$ sampling interval, where said qualification is responsive to an analog signal waveform amplitude that exceeds a second threshold.

19. The method of claim 18 wherein:
said sampling clock rate $F_s$ is less than or equal to 200% of said synchronous data clock rate $F_d$.

20. The method of claim 18 wherein said interpolation step (e.1) comprises the step of:

(e.1.1) interpolating by referring to a lookup-table containing a nonlinear characteristic for said differentiated analog signal waveform zero-crossing between said previous second signal $D_{i-1}$ and said second signal $D_i$.

21. The method of claim 18 wherein said creating step (e.3) comprises the steps of:

(e.3.1) creating a first said digital flag representing the qualification of a positive said analog signal waveform extremum; and (e.3.2) creating a second said digital flag indicating the qualification of a negative said analog signal waveform extremum.

* * * * *

UNITED STATES PATENT AND TRADEMARK OFFICE
CERTIFICATE OF CORRECTION

PATENT NO. : 5,293,369
DATED : March 8, 1994
INVENTOR(S) : Melas et al

It is certified that error appears in the above-indentified patent and that said Letters Patent is hereby corrected as shown below:

Column 10, line 64, please replace "s" with --$s_i$--.

Column 11, line 60, please insert --; and-- following "interval".

Column 15, line 16, please replace "$D_i$" with --$d_i$--.

Signed and Sealed this

Fifth Day of July, 1994

BRUCE LEHMAN

*Attest:*

*Attesting Officer*  *Commissioner of Patents and Trademarks*